(12) United States Patent
Dalhoff

(10) Patent No.: US 6,844,936 B2
(45) Date of Patent: Jan. 18, 2005

(54) DEVICE FOR THE NON-CONTACTING MEASUREMENT OF AN OBJECT TO BE MEASURED, PARTICULARLY FOR DISTANCE AND/OR VIBRATION MEASUREMENT

(75) Inventor: Ernst Dalhoff, Rottenburg (DE)

(73) Assignee: Hans-Peter Zenner, Tuebingen (DE); part interest ( * ) Notice: Subject to any disclaimer, the term of this patent is extended or adjusted under 35 U.S.C. 154(b) by 0 days.

(21) Appl. No.: 10/157,410

(22) Filed: May 29, 2002

(65) Prior Publication Data
US 2003/0011780 A1 Jan. 16, 2003

(30) Foreign Application Priority Data
Jun. 1, 2001 (EP) .............................................. 01113378

(51) Int. Cl.[7] ................................................. G01B 9/02
(52) U.S. Cl. ....................................................... 356/498
(58) Field of Search ................................. 356/485, 486, 356/496, 498; 372/32, 34

(56) References Cited

U.S. PATENT DOCUMENTS
4,061,425 A 12/1977 Wade
6,055,815 A * 5/2000 Peterson ....................... 62/3.7

FOREIGN PATENT DOCUMENTS
| DE | 22 47 709 A1 | 4/1974 |
|----|--------------|--------|
| DE | 26 34 210 A1 | 2/1978 |
| DE | 37 08 295 C1 | 8/1988 |
| DE | 197 40 678 A1 | 3/1999 |
| DE | 198 01 959 A1 | 7/1999 |
| DE | 198 06 240 A1 | 9/1999 |

OTHER PUBLICATIONS
R.H. Kingston, Detection of Optical and Infrared Radiation, Springer Series in Optical Sciences, Edited by David L. MacAdam, Springer–Verlag Berlin Heidelberg New York 1978, p. 25.

* cited by examiner

Primary Examiner—Samuel A. Turner
Assistant Examiner—Michael A. Lyons
(74) Attorney, Agent, or Firm—Quarles & Brady LLP

(57) ABSTRACT

A device for the non-contacting measurement of an object to be measured, particularly for distance and/or vibration measurement, has at least one laser light source, optical devices for splitting the light into object light (4) and reference light (5) for interacting with the object to be measured and for superimposing object light and reference light following the interaction of the object light with the object to be measured, preferably a frequency shift device in the form of a Bragg cell for producing a frequency shift between the object light and the reference light and a detecting device (15) for converting reference light and object light into electrical signals suitable for further processing. The detecting device has at least two series-connected optoelectronic transducers in the form of photodiodes (30, 31). Between the transducers is located a tap (32) for tapping a difference signal which, for further processing, is supplied to a transimpedance circuit (33) associated with one of the transducers. Thus, there is a subtraction of photodiode currents prior to processing in an amplifier circuit in a balanced detection arrangement. This inexpensively permits measurements at high reference light power with resolutions in the quantum noise limit range.

22 Claims, 2 Drawing Sheets

DEVICE FOR THE NON-CONTACTING MEASUREMENT OF AN OBJECT TO BE MEASURED, PARTICULARLY FOR DISTANCE AND/OR VIBRATION MEASUREMENT

TECHNICAL FIELD

The invention relates to a device for the non-contacting measurement of a object to be measured, particularly for distance and/or vibration measurement.

BACKGROUND ART

Laser interferometers o the preamble-basing type are particularly suitable for high-resolution distance of displacement measurement and a so vibration or oscillation measurement. The measurement can be performed in non-contacting manner and optically without any mechanical influencing of the object to b measured. Coherent light, which is preferably produced by laser light source, is split into the object light and reference light provided for interaction with the object to be measured. The object light is separately guided from the reference light in a measurement arm to the object to be measured, interacting therewith e.g. by reflection and is then superimposed with the reference light guided in a reference arm This leads to interference patterns, which are highly sensitive to the measurement arm length and the time variation thereof.

In the measurement of vibrating objects to be measured so-called heterodyne interferometers have been adopted, which inter alia allow a correct sign-characterization of the oscillations or vibrations. They are in particular characterized by at least one frequency shift device for producing a frequency shift between the object light or beam and the reference light or beam. This frequency shift can in particular be produced through the use of an opto-acoustic modulator, particularly a Bragg cell.

Heterodyne interferometers can be used for measurements on objects to be measured with optically smooth surfaces (e.g. mirrors, retroreflectors, etc.) and on such objects having optically rough surfaces. If the reflectivity of the object to be measured is in the lower range in which the interferometer is able to measure, then the precision or resolution of the measurement within a given measurement integration time is dependent on the reflected back object light power.

In the case of an optimum interferometer design, it is known to determine the lowest resolution limit attainable with conventional means through so-called shot noise of photons. Hereinafter this limit is also referred to as the quantum noise of photons or the quantum noise limit (QNL).

Scientific experiments, e.g. in the light beam communication field or astronomical interferometry have indicated that it is possible to perform measurements close to the quantum noise limit if on the detection side use is made of a so-called balance detecting device for converting reference light and object light into electrical signals (G. L. Abbas, V. W. S. Chan and T. K. Yee "Local-oscillator excess-noise suppression for homodyne and heterodyne detection". Optics Letters, vol. 8, no. 8 (1983), pp 419 to 421 or H. van de Stad "Heterodyne Detection at a Wavelength of 3.39 $\mu$m for Astronomical Purposes", Astron. & Astrophys. 36 (1974), pp 341 to 348). The detecting device proposed in the first publication for balanced detection has two identically constructed detectors with in each case a photoelectric cell and a suitable circuit for converting the photoelectric cell current caused by the incidence of light into a detector output voltage. For forming an evaluatable difference signal the detector output voltages are subtracted from one another, so that signal components based on steady light components in both detectors can be eliminated from the amplified subtraction signal.

The desire to measure as close as possible to the quantum noise limit is confronted in the case of heterodyne interferometers by the requirement for a measurement with a maximum heterodyne frequency. For a number of reasons, high heterodyne frequencies are desirable. Firstly, the interference or background noise can be suppressed in a broader band manner the higher the heterodyne frequency. Secondly, the permitted measurement object speed or the band width of the vibrations to be measured can be made higher the higher the heterodyne frequency is chosen. Finally, the most acousto-optical modulators can be given a smaller size and electric power consumption the higher the heterodyne frequency is chosen. However, the heterodyne frequency cannot be chosen in a arbitrarily high manner, because on the detection side the thermal noise of load resistors, where the measurement currents of optoelectronic transducers drop, increased in proportion to the heterodyne frequency level. Therefore in the case of higher heterodyne frequencies for obtaining resolutions in the quantum noise limit range, the reference light power should be made particularly high, so that the photon noise exceeds the thermal noise and becomes detectable.

Bearing this in mind it is possible to in principle perform a measurement with resolution in the quantum noise limit range. However, the structures used in research are too complicated and expensive or their environmental demands are too high, so that the presently commercially available interferometers do not reach the quantum noise limit.

Preamble-basing interference devices can be used with particular advantage in the medical field for obtaining data on the hearing power, e.g. via direct vibration measurements on the tympanum or eardrum. Examples of such measurements by means of laser Doppler vibrometry are e.g. described in international patent application WO 97/04706 or in the publication by N. Stasche, H. J. Foth and K. H örmann in HNO, 1993, 41, pp 1 to 6. The desire to measure as close as possible to the quantum noise limit here results from a naturally low reflectivity of the object to be measured (tympanum) and secondly through the wish to be able to measure extremely small oscillation or vibration amplitudes down to the picometer range, such as occur close to the hearing threshold in the medium frequency range. The problem is exacerbated by the fact that for practical applications, e.g. when treating patients on an outpatient basis in the clinic or through the ENT doctor, relatively short measurement times of typically less than one minute are sought.

The problem of the invention is to provide a preamble-basing device, which can be manufactured less expensively and which permits distance and/or vibration measurements with high resolution in the vicinity of the quantum noise limit. In particular, a highly sensitive, inexpensively manufacturable laser Doppler vibrometer is to be provided, which is in particular usable for the outpatient determination of data concerning the hearing power.

SUMMARY OF THE INVENTION

This problem in the art as described above is solved by the present invention.

A device according to the invention is characterized in that the detecting device has at least two series-connected optoelectronic transducers and that between the transducers is provided a tapping point for tapping a signal intended for further processing and in particular a difference signal. With the preferred use of photodiodes as optoelectronic transducers it is possible to ensure that a subtraction of the photodiode currents takes place prior to the photodiode current drop at a load resistor of a common amplifier circuit connected to the photodiodes. In the case of photodiodes as transducers a difference current signal is obtained at the tap. The current signal occurring on the transducers can consequently be further processed without a high direct current component, so that from the outset the processing can be concentrated on those information-carrying signal components based on differences between the diode currents of both transducers and from which a useful signal can be derived. Essentially no common mode currents flow across a coupled resistor, so that the full dynamics of an amplifier circuit are available for amplifying the useful signal. This circuit which can be looked upon as a particularly advantageous type of balanced detection permits the use of high-power reference light fields advantageous for obtaining resolutions in the quantum noise limit range, and which in the case of conventional detection circuits can lead to a high permanent current of the photodiodes.

It is also possible to use other optoelectronic transducers, e.g. photoresistors or phototransistors. The transducers of the series connection are preferably identical with regards to their electrical characteristics.

The signal tappable between the optoelectronic transducers of the series connection and which in particular represents a difference between the photocurrents of two photodiodes of the series connection, is in a preferred embodiment supplied to an amplifier circuit arrangement common to both transducers and which is preferably constructed as a transimpedance circuit. In the case of the detecting device according to the invention, for further processing the difference signal it is consequently possible to use a single, suitable circuit arrangement. Compared with solutions based on two detectors, whereof each has a transducer and an associated amplifier circuit, this means a reduction in the number of components necessary, so that costs can be reduced and at the same time improves the precision of signal evaluation, because differences between several amplifier circuits resulting from component tolerances can be avoided when using a single amplifier circuit. The tap can in particular be connected in signal-conducting manner to an input of an operational amplifier or another element acting in the same way.

According to a further development, the detecting device has a bias device for generating a substantially constant electric bias at the series connection in the transducer blocking direction. As a result the capacitance thereof can be reduced, which permits a low-noise signal generation even in the case of interferometers in which measurement information is transmitted in a high frequency band, e.g. with heterodyne interferometers operating e.g. with carrier frequencies of approximately 80 MHz.

According to a further development, the detecting device is characterized by a particularly high efficiency of the conversion between the incident light and the output signal of the optoelectronic transducer. This is brought about in that at least one of the transducers and preferably both of them, have a light impact surface or target which, relative to the incidence direction of the light is essentially oriented in the Brewster angle. This angle, which is dependent on the refractive indexes of the media adjacent to the target is characterized in that with reflection under the Brewster angle the reflected light is completely linearly polarized and the reflected and refracted light, i.e. the beam penetrating the optically denser medium are mutually orthogonal. This ensures that a maximum of the incident light is converted into photodiode current.

The detecting device with a series connection of optoelectronic transducers and a signal tap between the transducers, as well as further developments thereof constitute a highly sensitive, low-noise detecting device, which can be used with particular advantage in the heterodyne laser interferometry described. However, detecting devices according to the invention can also be used with means not having frequency shift devices between the object and reference beam or devices with correspondingly arranged phase shift devices.

The hitherto described measures contribute on the detection side to an improvement of the resolution of the interferometry means down to the quantum noise limit range. However, measures acting to improve resolution in the light generation range are also possible. As stated, in the case of heterodyne interferometers in order to permit measurements at the quantum noise limit, it is necessary for the detection-side signal level to be higher than the level of the thermal noise of components of the detecting devices and in particular their load resistors. This can be achieved through a correspondingly high reference light power. The gas lasers frequently used nowadays, particularly in stationary equipment and research layouts become more expensive and larger with increasing power. In an advantageous further development a laser diode constitutes the light source. Laser diodes are not only able to offer the desired high light powers of e.g. up to 1 mW, but are also inexpensively obtainable and are characterized by compact sizes. A particular advantage for uses of the vibration measurements according to the invention in the medical sector and particularly in conjunction with operations, results from the fact that compared with gas lasers, laser diodes have very short warm-up times until the full power is reached and consequently the full measurement resolution is available.

As is known, the emission frequency of laser diodes is highly temperature-dependent, which can impair the measuring precision. So-called mode hopping is the particular cause of this. In order to reduce temperature fluctuation-caused colour drift of the light source, according to a preferred development a multistage temperature stabilizing device is provided for stabilizing the light source temperature. The temperature stabilizing device has a thermostatted, first stabilizing unit heat-conductively connected to the light source and which is connected in heat conducting manner with at least one thermostatted, second stabilizing unit. As a result, due to its temperature control, the second stabilizing unit creates a relatively temperature-stable environment for the first stabilizing unit and the light source. Relative to this environment, which only has relatively small temperature fluctuations, the function of the first stabilizing unit is to further and more precisely stabilize the light source temperature. Multistage temperature stabilization, which can optionally have more than two stages, constitutes an inexpensive, constructional possibility of ensuring extremely stable light source temperatures without high temperature control costs, which in turn leads to a high frequency stability of the coherent light emitted. Attainable temperature fluctuations can be in the range well below 1 mK and e.g. between approximately 1 $\mu$K and approximately 10 to 20 $\mu$K.

The explained multistage temperature stabilization concept for the light source can be used independently of other features of the invention in all applications where particular importance is attached to a high frequency stability of the coherent light. The concept is particularly suitable for balanced interferometers, i.e. those having an identical length of object or measurement arm and reference arm, as well as for unbalanced interferometers where, due to a large measuring range, importance is attached to a high laser frequency stability. Gas lasers or other lasers can be temperature-stabilized in this way instead of laser diodes.

All suitable means can be used for the temperature change and temperature detection necessary for thermostatting the stabilizing units. It is particularly advantageous if the first stabilizing unit and/or second stabilizing unit has for changing the temperature of said stabilizing unit at least one Peltier element, because as a result both temperature rises and falls are possible. For determining the temperature it is e.g. possible to measure the resistance of a thermistor and supply same to a control system controlling the Peltier element or another heating device.

For the further improvement of the measurement precision, preferably at least one optical element for splitting and/or guiding the light of the light source is fitted together with said light source to a thermostatted stabilizing unit. It can in particular be a collimating optics and/or an optical isolator, i.e. a device preventing light being coupled back into the light source. Through the joint temperature stabilizing the relative geometrical arrangement of said components with respect to one another remains largely insensitive to temperature influences. Alternatively or additionally it is possible for at least one optionally present frequency shift device, particularly a Bragg cell to be temperature-stabilized and for this purpose it can e.g. be fitted to one of the stabilizing units, particularly the second stabilizing unit. Thus, temperature influences on the frequency shift can be largely eliminated.

Devices according to the invention are preferably constructed as heterodyne interferometers. The frequency shift between the object light and the reference light necessary for heterodyne interferometer operation can e.g. be obtained by tuning a laser diode in conjunction with a transit time difference between the measurement and difference light, i.e. in an unbalanced arrangement. Preferably the frequency shift device is constituted by an acousto-optical modulator, particularly a Bragg cell, which functions without movable components. In an embodiment a single frequency shift device is used, so that the structure is particularly inexpensive. Object light phase modulation is also possible.

BRIEF DESCRIPTION OF THE DRAWINGS

These and further features of the invention can be gathered from the following description of a preferred embodiment in conjunction with the claims and drawings. The individual features can be implemented singly or in the form of combinations. In the drawings show:

DETAILED DESCRIPTION

Figure 1:
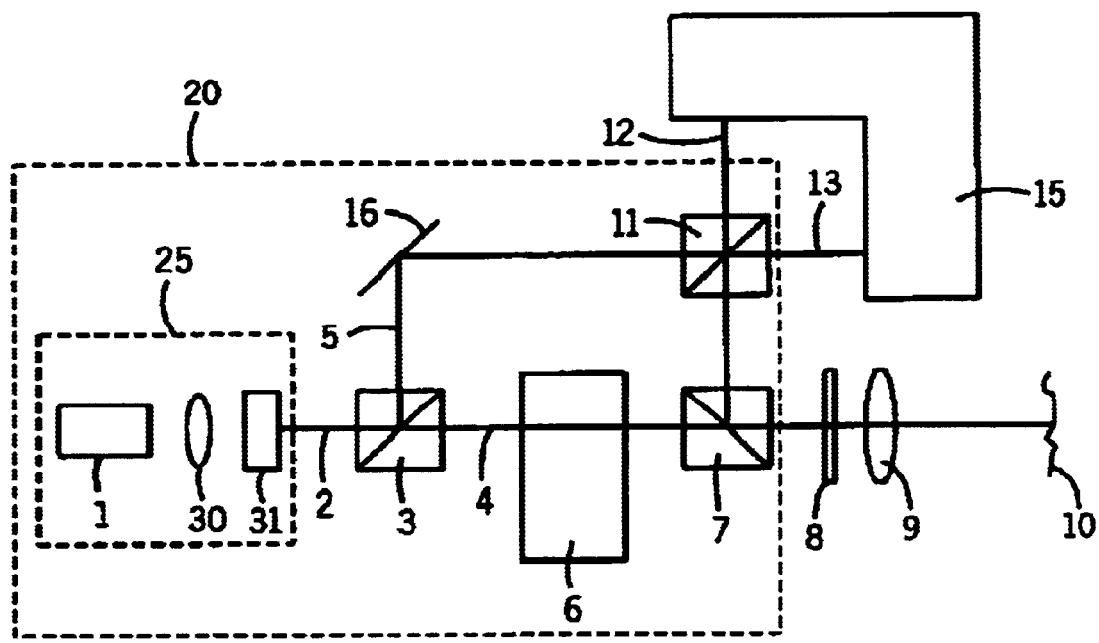
FIG. 1 A diagrammatic representation of the structure of an embodiment of a laser interferometer according to the invention.

The embodiment of an inventive device for the non-contacting measurement of a object to be measured diagrammatically shown in FIG. 1 is constructed as a heterodyne laser interferometer and in particular permits high sensitivity measurements of tympanum and aciculums vibrations by laser Doppler micrometry. A laser light source 1 comprises a laser diode, which emits coherent light in the near infrared with an output of over 10 maw. The laser beam 2 is collimated by a collimating optics 30, and can be guided by an optionally provided isolator 31, which prevents light from being coupled back into the laser 1. The collimated laser beam strikes a polarizing base splitter 3, which splits the impacting light into through object light 4 and deflected reference light 5. In the so-called measurement arm of the device, the object light or beam 4 passes through a frequency shift device 6, which is preferably a high frequency, acousto-optical modulator in the form of a Bragg cell. For laser light modulation it is controlled with a heterodyne frequency of e.g. 80 MHz, which is superimposed on the coherent light frequency. The frequency-modulated object light then strikes a further polarizing beam splitter 7 and after passing through the latter strikes a quarter-wave plate 8, which brings about a phase shift of the object light by quarter the wavelength of the impacting light. The object light passing from the quarter-wave plate 8 is focused by a suitable optics 9, diagrammatically represented by a lens, onto a quasi-punctiform measurement area on the surface of a measurement object 10, which can e.g. by the tympanum of a patient.

Part of the reflected back light is guided by the optics 9 and quarter-wave plate 8 to the beam splitter 7 which, in the case of a suitable setting, is substantially completely deflected in the direction of a further beam splitter 11, which is appropriately constructed in non-absorbing manner for obtaining a very high detector-side light intensity. The beam splitter 11 splits the incident object light into a component 12 oriented in the extension of the incidence direction and a component 13 passing in particular at a right angle to the incidence direction. These components strike at spatially separated points a detecting device 15.

The reference light 5 branched off, e.g. at right angles from the incident laser light at the beam splitter 3 is deflected in the reference arm by a mirror 16 in the direction of the detector-near beam splitter 11 and strikes the latter in an incidence direction which is ideally coaxial to the direction of the component 13. The incident reference light in beam splitter 11 is split into a component coinciding with the component 13 and a component coinciding with the object light component 12, so that from both beam splitter outputs there is a superimposing of object light and reference light and which strike the detecting device 15 at spaced locations.

In place of this known arrangement, in which the object light striking the object to be measured, behind the beam splitter 7, on the path to the object 10 covers the same path as on the return, transmitting and receiving optical paths of the object light can also be spatially separated. It is also possible to couple the object light path into a microscope or other optical devices, e.g. in the way described in WO 97/04706. To this extent the content of the latter publication is made into part of the present description. For example in a pure Mach-Zehnder arrangement it is possible to register a change in the optical path length of the object light in a single passage through an object to be measured. Thus, the invention can also be used for measurements in transmission.

Hereinafter are described special measures implemented in the embodiment and which require an increase in the measuring precision and the resolution of such arrangements and which in particular permit inexpensively the upgrading of arrangements in such a way that it is possible to carry out measurements with resolutions in the quantum noise limit range.

Figure 2:
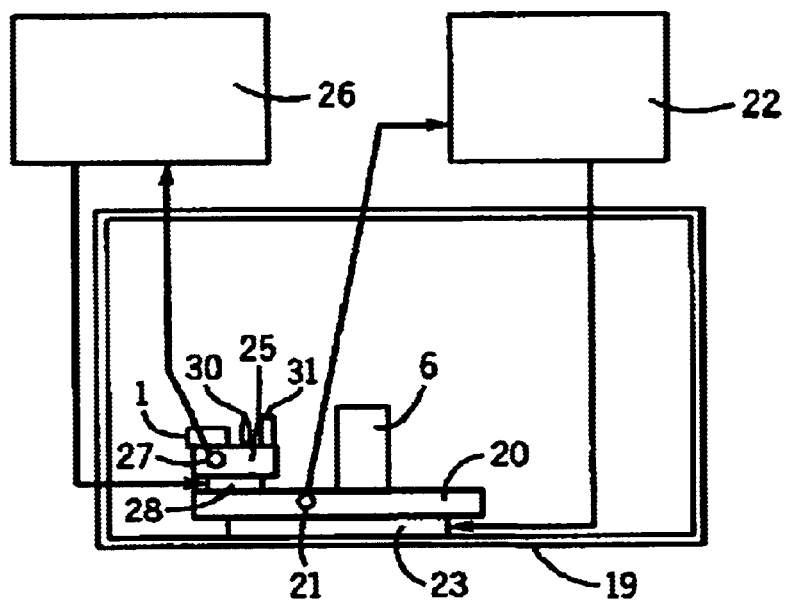
FIG. 2 A diagrammatic representation of parts of a device according to the invention for illustrating the two-stage temperature stabilization of a laser diode.

Advantageous measures on the side of light generation and guidance are explained in conjunction with FIG. 2. As stated, the quantum noise limit can in particular be reached in that working takes place with a comparatively high reference light intensity. This is cost effectively possible through the use of a laser diode as the light source. As the emission frequency of laser diodes is highly temperature-dependent and a high frequency stability is sought, in the preferred embodiment the temperature of the laser diode 1 is stabilized in high precision manner. In the embodiment shown this is achieved in that significant parts of the interferometer are located in a casing 19 on a main chassis or main component carrier 20, which is temperature-stabilized or thermostatted by suitable devices. In the example, for determining the temperature of the chassis 20 is provided a thermistor 21 fitted thereto and whose resistance is a measure of the chassis temperature. In a second control device 22 connected in signal-conducting manner to the thermistor, the temperature signal of the thermistor is process and from it is determined a suitable value for the driving current of a Peltier element 23 connected of the power output of the control device 22 and which is in good, large-area heat conducting contact with the main chassis 20. The thermostatted main chassis 20 creates a second temperature stabilizing unit which forms a thermal environment only having limited temperature fluctuations for all components of the device heat-conductively connected and in particular fixed thereto.

The laser diode 1 is fixed to its own, separate light source carrier chassis 25 forming a first stabilizing unit, whose temperature is controlled by a first control device 26 separate from the second control device. For this purpose on the light source carrier chassis 25 is fixed an alternating voltage-controlled thermistor bridge 27 in the form of a temperature sensor and whose measurement signal is evaluated by a lock-in circuit of the first control device 26. To the output of the control device 26 is connected a further Peltier element 28 located between the main chassis 20 and the subchassis 25 and through which the temperature of the laser source chassis 25 and therefore the temperature of the laser source 1 is precisely stabilized with respect to the temperature of the main chassis 20 only subject to minor fluctuations. Experiments have shown that the maximum temperature fluctuations of the laser light source can be in the range approximately 1 to approximately 10 $\mu K$.

Advantageously the two-stage temperature stabilization acts not only on the laser light source, but also on at least some of the optical components referred to in conjunction with FIG. 1 for the purpose of influencing and guiding the beam. For example, the temperature control of the interferometer chassis 20 can lead to a dissipation of the waste heat of the acoustic modulator 6 fitted to the top of the chassis and a stabilization of the adjustment of the optical components, not shown in FIG. 2, fitted to the chassis. In addition, the main chassis 20 creates a temperature-stable environment for the subchassis 25. To the subchassis 25 can be fixed a collimating optics 30 and optionally an optical isolator 31, which directly influence the quality of the output light striking the beam splitter 3.

Figure 3:
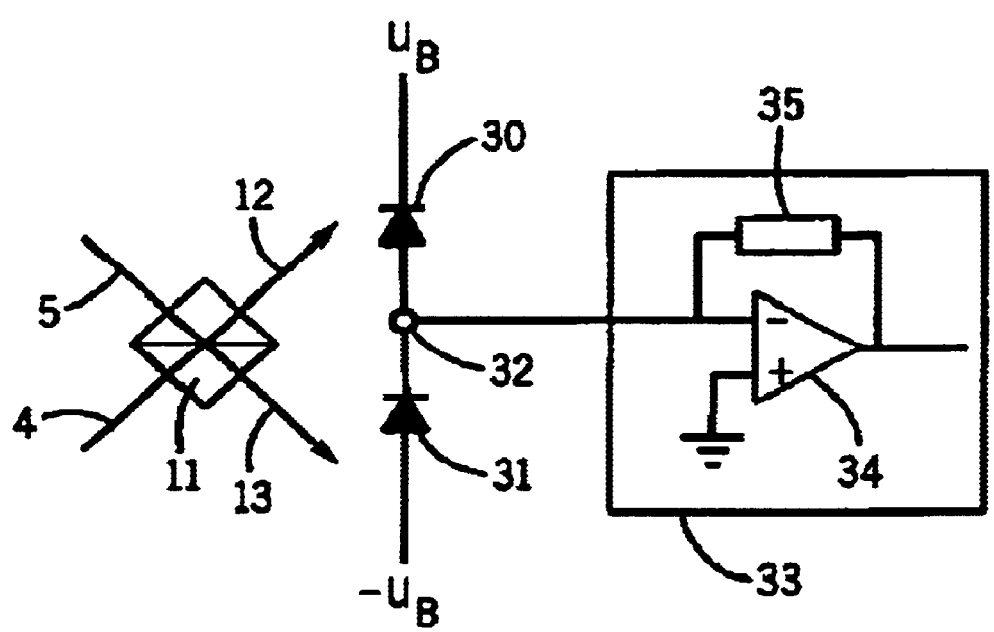
FIG. 3 A basic diagram of an embodiment of a detecting device according to the invention.

A preferred embodiment of the detecting device 15 will now be described relative to FIG. 3, where it is possible to see a beam splitter 11 associated with the detector and which splits the incident reference beam 5 and the incident object beam 4 in such a way that at both outputs of the beam splitter exit two beam components 12, 13 at right angles to one another and which in each case contain in superimposed form a reference light component and an object light component.

For converting the incident light into electrically further processable signals, the detecting device 15 has two series-connected photodiodes 30, 31, which can be so positioned relative to the beam splitter 11 that the heterodyne beam 12 located in the extension of the object light strikes the first photodiode 30 and the component 13 located in the extension of the reference beam strikes the second photodiode 31 in spaced manner therefrom. The photodiodes 30, 31 in each case have planar light targets which, relative to the incidence direction of the beam striking them, are oriented in a Brewster angle of approximately 50 to 70°. This leads to an optimum conversion level of impacting light intensity to the intensity of the generated, electric signal (photodiode current).

With regards to their electrical characteristics, the spatially separated photodiodes are ideally identically constructed. Through a net shown electric bias device the photodiodes are biased with a constant electric direct current voltage, $U_B$, of e.g., 15 volts for each photodiode in the blocking direction. Thus, the limit frequency of the transmission function, i.e. the frequency at which the signal amplitude drops to 50% of its full value, is displaced towards high frequencies, which has a positive effect on the system band width. Preferably symmetrically between the photodiodes 30, 31, in the series connection is provided a voltage tap 32, which is at zero potential relative to the bias voltage and at which can be tapped a difference signal, which arises through differences in the photodiode currents of both photodiodes. The tap 32 is connected to the input of a transimpedance circuit 33, which in the preferred embodiment has an operational amplifier 34, whose negative input is connected to the tap 32 and whose positive input is connected to earth or ground. The tap 32 is also connected to the output of the operational amplifier by means of a load resistor 35 acting as a feedback resistor.

As a result of this circuit the transimpedance circuit 33 is used for both photodiodes 30, 31, in that the voltage is tapped between the series-connected photodiodes under double bias and is amplified by the circuit 33. The use of a photodiode current difference signal as the input signal for the transimpedance circuit leads to common mode currents, i.e. those currents occurring simultaneously and in the same way (amplitude, frequency) with both photodiodes 30, 31 do not flow across the feedback resistor 35, so that the full dynamics of the transimpedance circuit are available for evaluating the difference signal carrying information on the object to be measured. Since as a result of the circuit according to the invention difference formation and therefore elimination of the steady light component takes place by subtraction of the photodiode currents prior to the drop in said currents at a load resistor, the evaluating circuit is not loaded by high direct currents resulting from high steady light components, so that e.g. problems of the saturation of the detecting device, which can arise in conventional detectors, are avoided. Thus, without problem it is possible to use powerful reference light fields, which for the reasons indicated hereinbefore are advantageous for improving the resolution into the quantum noise limit range.

It is obvious to the expert that for the evaluation and/or amplification of the difference signal occurring at the tap 32, it is possible to use any suitable analog and/or digital circuit arrangement. When using a transimpedance circuit it need not necessarily be connected in an inverting manner. If particularly inexpensive solutions are desired, it is e.g. also possible not to use operational amplifiers and to conduct a difference photodiode current directly through a load resistor and to use the voltage drop at the load resistor for further processing purposes.

Inventive devices are not only advantageously usable in the illustrated applications in the medical sector. Interferometers with resolutions in the quantum noise limit range are e.g. also advantageous for measurements over long distances on rough surfaces, e.g. for interferometric measurements on vibrating vehicle body parts. As a result of the large operating range, the evaluatable light intensity is very small, because generally detectors only determine a very small solid angle of reflected back light intensity.

What is claimed is:

1. Device for non-contacting measurement of an object to be measured comprising:

at least one light source for emitting coherent light;

optical devices for splitting the light into object light for interacting with the object to be measured and reference light and for superimposing the object light and reference light following an interaction of the object light with the object to be measured, and a detecting device for converting the reference light and the object light into electrical signals suitable for further processing, wherein the detecting device has at least two series-connected optoelectronic transducers, and a tap for tapping a signal for further processing being provided between the transducers, and wherein a multistage temperature stabilizing device is provided for stabilizing the temperature of the light source, the multistage temperature stabilizing device comprising a thermostatted, first stabilizing unit connected in heat-conducting manner to the light source and a least one thermostatted, second stabilizing unit connected in heat-conducting manner to the first stabilizing unit.

2. Device according to claim 1, wherein at least one optical device for at least one of splitting and superimposing light of the light source is fitted to a thermostatted stabilizing unit.

3. Device according to claim 2, wherein the at least one optical device for at least one of splitting and superimposing light of the light source is fitted to the second thermostatted stabilizing unit.

4. Device according to claim 1, wherein at least one frequency shift device is fitted to a thermostatted stabilizing device.

5. Device according to claim 1, wherein at least one optical device for influencing the light of the light source is fitted jointly with the light source to a the first thermostatted stabilizing unit.

6. Device according to claim 5, wherein the optical device for influencing the light of the light source is one of a collimating optics and an optical isolator.

7. Device according to claim 1, wherein at least one of the first stabilizing unit and the second stabilizing unit is associated with at least one Peltier element for modifying the temperature of the stabilizing unit.

8. Device according to claim 1, wherein the optoelectronic transducers are photodiodes.

9. Device according to claim 1, wherein the optoelectronic transducers are essentially identical in design.

10. Device according to claim 1, wherein the signal at the tap is a difference signal.

11. Device according to claim 1, wherein the detecting device has a single amplifier circuit associated with the at least two optoelectronic transducers for further processing the signal.

12. Device according to claim 11, wherein the amplifier circuit is a transimpedance circuit.

13. Device according to claim 1, wherein the tap is directly connected to an input of an operational amplifier.

14. Device according to claim 1, wherein a bias device is provided for generating a substantially constant electric bias voltage at the series-connected optoelectronic transducers in blocking direction of the transducers.

15. Device according to claim 1, wherein at least one of the transducers has a light impact surface which, relative to a light incidence direction, is essentially oriented in the Brewster angle.

16. Device according to claim 1, wherein the light source is a laser diode.

17. Device according to claim 1, wherein at least one frequency shift device is provided for producing a frequency shift between the object light and the reference light.

18. Device according to claim 17, wherein the frequency shift device is an acusto-optical modulator.

19. Device according to claim 1, wherein the device is adapted for at least one of distance and vibration measurement.

20. Device for non-contacting measurement of an object to be measured comprising:

at least one light source for emitting coherent light;

optical devices for splitting the light into object light for interacting with the object to be measured and reference light and for superimposing the object light and reference light following an interaction of the object light with the object to be measured, and a detecting device for converting the reference light and the object light into electrical signals suitable for further processing, wherein the detecting device has at least two series-connected optoelectronic transducers, a tap for tapping a signal for further processing being provided between the transducers;

wherein a multistage temperature stabilizing device is provided for stabilizing the temperature of the light source, the multistage temperature stabilizing device comprising a thermostatted, first stabilizing unit connected in heat-conducting manner to the light source and at least one thermostatted, second stabilizing unit connected in heat-conducting manner to the first stabilizing unit, and wherein the at least one optical device for at least one of splitting and superimposing light of the light source is fitted to the second thermostatted stabilizing unit.

21. Light source device according to claim 20, wherein at least one optical device for influencing the light of the light source is fitted jointly with the light source to the first thermostatted stabilizing unit.

22. Light source device according to claim 20, wherein the light source is a laser diode.

* * * * *